United States Patent [19]

Gervasi

[11] 4,085,050
[45] Apr. 18, 1978

[54] CONTINUOUS FILTER WITH CONTINUOUS CAKE REMOVAL

[76] Inventor: Enzo Gervasi, Viale Stazione, 13, Cervignano Del Friuli (Udine), Italy

[21] Appl. No.: 698,027

[22] Filed: Jun. 21, 1976

[30] Foreign Application Priority Data

Jul. 2, 1975 Italy .............................. 46880 A/75

[51] Int. Cl.² ............................................. B01D 35/16
[52] U.S. Cl. ..................................... 210/332; 210/414
[58] Field of Search .......... 210/75, 407, 408, 413–415, 210/396, 397, 332; 209/273, 389; 15/104.05, 104.09, 104.1 R

[56] References Cited

U.S. PATENT DOCUMENTS

| 696,506 | 4/1902 | Stanley | 210/414 X |
|---|---|---|---|
| 1,990,992 | 2/1935 | Lang et al. | 210/414 X |
| 3,739,915 | 6/1973 | Kehoe et al. | 210/415 X |

FOREIGN PATENT DOCUMENTS

| 631,961 | 11/1961 | Canada | 210/413 |
|---|---|---|---|
| 22,869 of | 1914 | United Kingdom | 210/414 |

Primary Examiner—William A. Cuchlinski, Jr.
Attorney, Agent, or Firm—Brisebois & Kruger

[57] ABSTRACT

Filter unit comprises scraper means provided spaced apart from the rigid perforated arresting wall, on which a filtering member, such as a cloth, is supported, in order to maintain at a predetermined value the thickness of the filter bed consisting of the turbid particles.

7 Claims, 5 Drawing Figures

CONTINUOUS FILTER WITH CONTINUOUS CAKE REMOVAL

SUMMARY OF THE INVENTION

A filter unit notably consists of:
- a feed chamber for the turbid product to be filtered;
- an arresting surface for the suspended turbidity, or filter bed;
- a collection chamber for the liquid filtrate.

There must be a sufficient pressure difference between the feed chamber and collection chamber to ensure that the liquid part will flow and will overcome the resistance to its passage provided by the filter bed.

The filter bed may possess a direct arresting power for the solid suspended material (filter paper, filter tube), in which case the filtering power ceases when the arresting power of the filter bed is exhausted (due to blockage or clogging of the active surface).

Alternatively, the filter bed may consist of a mechanical support and an arresting cake, and will comprise a metal, fabric or plastic filter cloth, possibly stiffened by a perforated or corrugated supporting sheet, the active filtering elements becoming deposited in layers on the cloth to form an actual filter bed consisting of a cake of solid particles, the cake having a certain thickness and reduced permeability so as to prevent passage of the suspended solids but permit passage of the clarified liquid.

In the most simple case, the cake consists of the particles suspended in the liquid to be filtered, which form layers when arrested by the cloth, with their arresting power increasing in proportion to the increase in the cake thickness.

Beyond a certain generally low limit, the cake becomes impermeable and the filtering flow rate falls to extremely low levels.

The filtration diagram therefore comprises very high initial flow rates, which fall substantially with time as the cake thickness becomes appreciable.

On the other hand, the degree of clarity of the filtrate increases between the initial stage (thin cake, with low arresting power) and the subsequent stages (cake of adequate thickness).

This indicates the advisability of recycling the first filtered liquid back to the feed, allowing its through passage only when it is clear, i.e. when a cake of adequate thickness has been formed.

In this type of process, the compactness and low permeability of the cake create considerable opposition and resistance to liquid passage, and require the use of high feed pressures to overcome this resistance.

Instead of using the suspended solid to form the filter bed, a filter bed may be preformed on the cloth (precoat) using a filter aid (diatomite, asbestos fibre or cellulose fibre) applied at the beginning of filtration by a liquid suspension fed to the filter cloth by a pump and arrested by the cloth.

The cake formed by the filter aid then arrests the turbid particles, either on the surface exposed to the arriving product or within its own bulk.

However in these cases there is a tendency for rapid clogging of the active filter surface by the formation of an impermeable layer consisting of the arrested turbid particles.

Consequently in modern filters the filter aid (e.g. diatomite) is continuously metered into the products to be filtered, so that the layer formed on the back of the precoat is a permeable mixture of filter aid and turbid substance, instead of an impermeable layer of turbid substance alone.

In this way the moment at which the active filtering layer becomes exhausted is postponed until the cake thickness is such as to reduce the filtration flow rate to below an acceptable level, and increase the feed pressure above a critical point incompatible with the stability of the cake structure or the tightness of the filter.

The filtration diagram therefore falls gradually from the beginning to a point in which filtration has to be stopped. The spent cake has to be removed, the filter cleaned and a new precoat formation cycle commenced.

All known filters present a series of disadvantages which partly affect the efficiency of the actual filtration (e.g. during the first stage of bed or filter cake formation) and partly affect the productive capacity of the filter, which is nceessarily low because of the need to periodically halt the filter operation in order to clean it and, if required, recreate the filter precoat.

The object of the present invention is to provide a filter of the aforesaid type, and by implication a filter process, which besides eliminating the aforementioned disadvantages by a construction which is both simple and economical, also enables other important advantages to be obtained.

The aforesaid objects are attained according to the invention by a filter comprising devices to remove continuously, or intermittently at very short intervals and always during the course of the filtration (and not at the end of each cycle, as in known filters), a layer of cake equal in thickness to the excess formed above the precoat and which reduces and compromises the filtration rate.

The invention also relates to a filtration process in which the filtration layer or bed, whether consisting only of the particles suspended in the turbid liquid or of a mixture of these and a filter aid powder (for example diatomite) or the filter aid power alone, is always maintained at a constant thickness sufficient to obtain the required degree of turbid liquid clarification, or at a level close to said thickness, by the continuous or substantially continuous removal of the solid successively deposited on said basic filter bed. If operating without filter aids, i.e. with a cake consisting only of the particles in the turbid liquid, only the minimum cake thickness for a sufficient arresting power and sufficient degree of clarification of the filtrate will be left in contact with the filter cloth supported by the perforated cylinder, and the surplus thickness of the continuously deposited cake of turbidity particles is continuously removed.

In this way a thickness sufficient to reduce the filtration capacity and flow rate is not reached.

If operating with filter aids, i.e. with a precoat consisting for example diatomite alone and a subsequent cake consisting of diatomite and turbidity particles, only this precoat, of adequate thickness, will be left in contact with the cloth while the surplus thickness of mixed "turbidity + filter aid" cake which gradually forms in layers behind the precoat is continuously removed.

This enables the maximum allowable capacity of the system to be maintained, or values very close thereto.

Consequently the diagram of flow rate against time will be a substantially linear or slightly sawtoothed curve, substantially parallel to the time axis and fluctuating about a constant value. Known filtration processes on the other hand are characterised by a flow rate curve which decreases decisively with time as a function of the progressive clogging of the filter.

The "filtration cycle", i.e. the time between two shutdowns of the filter for cleaning, is considerably increased, and depends only on the speed of clogging of the precoat or base layer.

By means of the invention the time necessary for final and periodical filter cleaning is consequently reduced, as only the precoat has to be removed.

The consumption of filter aid is also reduced, as the massive doses necessary in known filters and processes for postponing the reduction in permeability (and hence the increase in pressure required for operation) due to the gradual thickening of normal filter cakes (which in contrast according to the invention remain of constant thickness) are avoided.

According to the invention, the filter consists essentially of a vertical perforated cylinder closed at its two ends.

The liquid to be filtered is fed under pressure to the top, and the turbidity retained by the filter is withdrawn from the bottom by way of a conduit connected to a suction pump.

The inner wall of said perforated cylinder supports the filter cake, the thickness of which is kept constant during the filter operation at a value very close to its maximum efficiency, by a worm or a set of blades carried by a rotating shaft coaxial to the cylinder, and situated therein, said blades or worm having an adjustable outer diameter such that a filter cake of optimum thickness for filtering the liquid forms and is maintained in the interspace which remains between the perforated cylinder and said worm or blades.

The worm therefore enables the surplus cake formed between the perforated cylinder and said worm to be removed and conveyed to the bottom continuously.

During the filtering operation, the speed of this shaft is very slow or intermittent, and proportional to the speed of deposition of the solid part of the turbid liquid.

The central shaft supporting the worm is hollow and perforated, and pressurized water may be fed into it to wash the filter on completion of the filtering operation.

During this wash stage, the speed of the perforated shaft is raised to a comparatively high level to enable the jets of water projecting from it to perform an effective cleaning operation.

The invention also provides an alternative method of operating the filter, according to the type of filter cake.

As in the case of normal filters operating under vacuum, a filter cake of required thickness could be preformed from diatomite, and a layer of the cake with the deposited turbidity could be continuously removed to reduce it to a minimum thickness below which its mechanical consistency becomes impaired and it requires reforming. For the purposes of the invention, it is not important whether the liquid flow takes place under positive or negative pressure, provided the panel is formed on the inner wall of the drum.

Consequently the means for carrying out the process comprise scraper means situated in the drum, and which have a working diameter which increases with time.

The operational and constructional advantages and characteristics of the invention will be more evident from the detailed description given hereinafter by way of example of a preferred but non-limiting embodiment of a filter according to the invention, illustrated in the accompanying drawings, in which.

Figure 1:
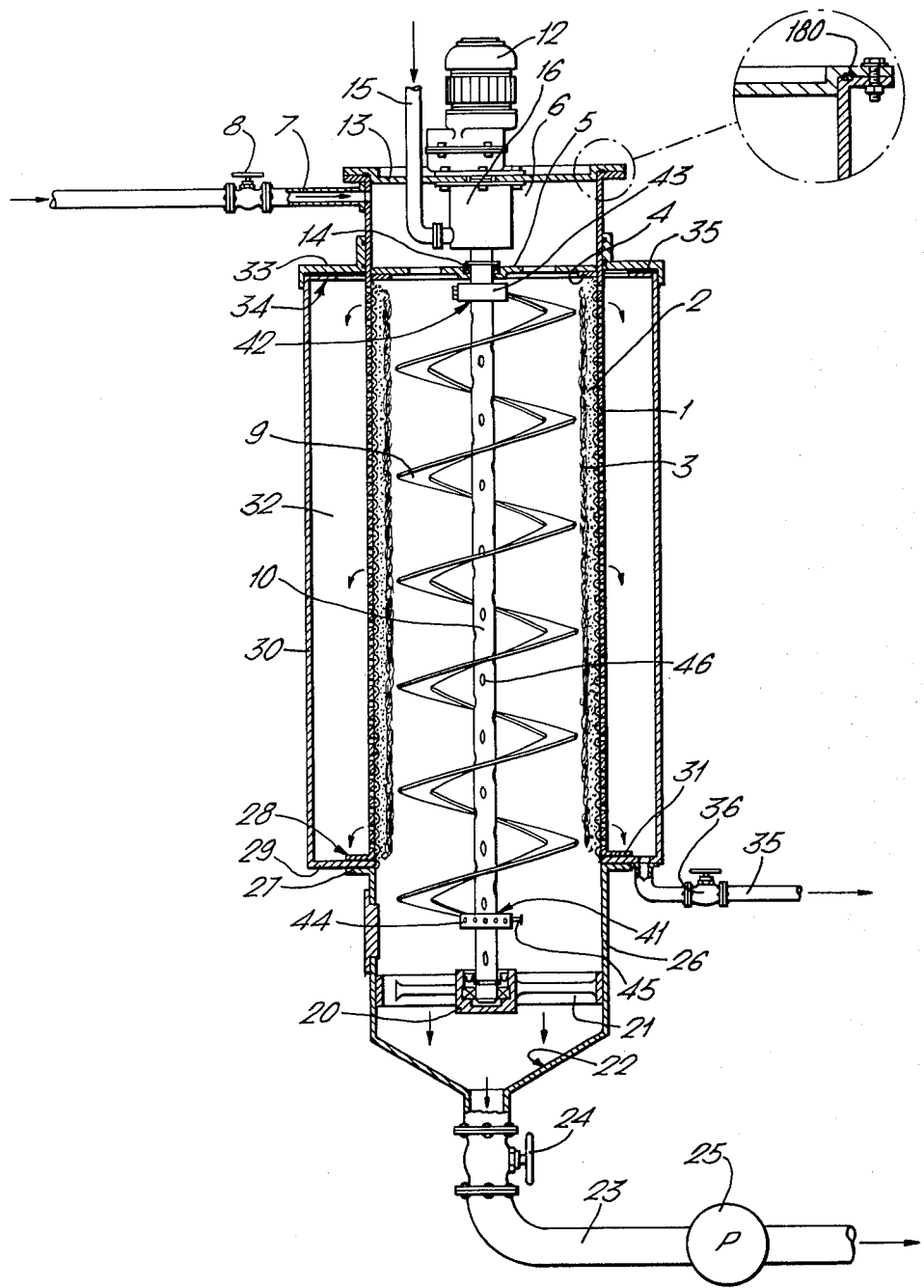
FIG. 1 is a vertical section through the invention.

The aforesaid figures show a preforated cylinder 1 which supports the filter 2 on which the cake 3 is formed.

The perforated cylinder 1 carries at its top an abutment collar 4 on which is fixed a perforated plate 5 which determines the inlet chamber 6 for the fluid to be filtered.

The chamber 6 is connected to a conduit 7 through which the fluid to be filtered is fed under pressure.

A gate valve 8 in the conduit 7 allows this conduit to be opened and closed.

A worm (or helical spiral) 9 mounted on a perforated tube 10 is disposed inside and coaxial with the cylinder 1.

Said perforated tube 10 is rotated by the shaft 11 of a variable speed motor 12 situated on the upper closure plate 13 of the cylinder 1.

Suitable seal means 180 visible in FIG. 1 are placed between the perforated tube 10 and the plate 13.

Said perforated tube 10 is guided and supported by a suitable bearing 14 situated on the plate 5.

The perforated tube 10 is connected to a conduit 15 through which water is fed under pressure on termination of the filtering operation.

By rotating the perforated tube at high speed, the pressurised water leaving the perforations completely washes the filter.

Figure 4:
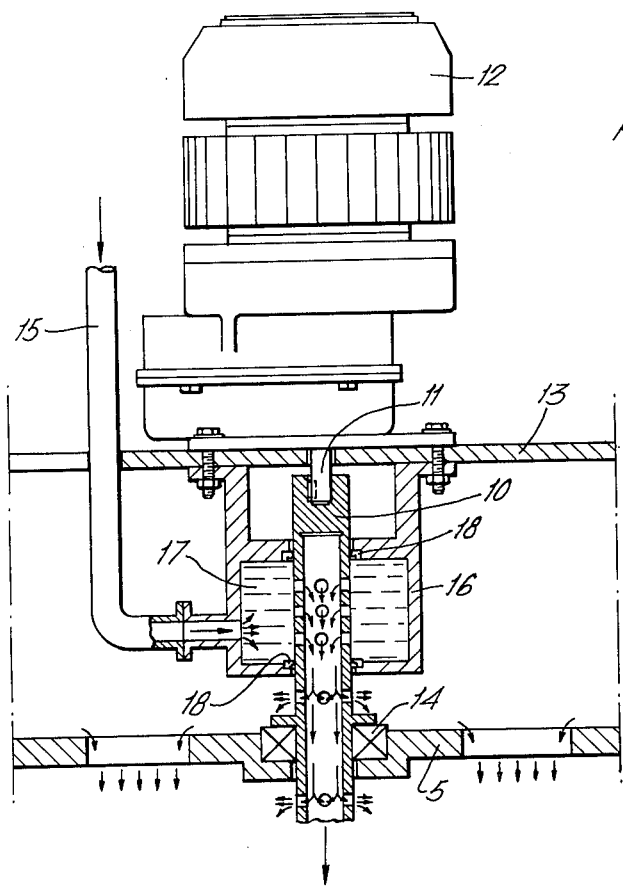
FIG. 4 is a detailed section through the upper part of the filter.

A distributor (FIG. 4) situated between the chamber 6 and fixed to the plate 13 conveys the water to the perforated rotating tube 10.

Said distributor 16 is in the form of an annular chamber 17 in which the shaft 10 rotates.

The seal is provided by two gaskets 18.

The chamber 17 is connected to the feed pipe 19.

The perforated tube 10 is supported at its lower end by a bearing 20 situated in the centre of a grill of ray formation 21, through which the solids removed by the worm during the filtering operation fall into the conical base 22 of the cylinder 26.

The conical base of the cylinder is connected to a discharge duct 23 comprising a gate valve 24 and suction pump 25.

The gate valve 24 is opened only when sufficient sludge has been collected in the base to fill the conical part 22.

The cylinder 26 comprises an outer abutment collar 27 at the top.

An identical abutment collar 28 is provided on the bottom of the cylinder 1.

The base, in the form of a circular rim 29, of an external cylinder 30 in which the filtrate is collected is held between said abutment collars 27 and 28.

Normal gaskets 31, for example of rubber, are placed between the collars 27 and 28 and the base 29 to provide a seal.

The chamber 32 determined by the perforated cylinder 1 and outer cylinder 30 is closed at its top by a plate 33 in the form of a circular rim which is engaged with an underlying flat circular rim 34 rigid with the cylinder 1.

A gasket 35 is placed between said rims 33 and 34 for sealing purposes.

The connection between the flanges 27, 28 and 29, and between the flanges 33 and 34 is provided by normal bolts with sealing means, or other known means, not shown.

The bottom of the chamber 32 is connnected to a discharge duct 35 comprising a gate valve 36.

Figure 2:
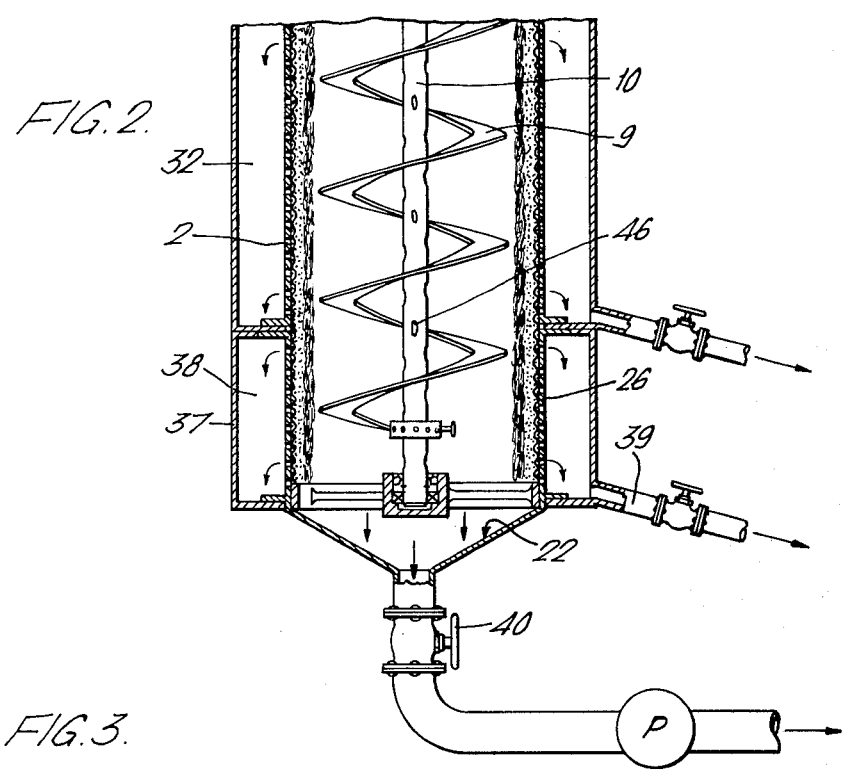
FIG. 2 is a vertical section through the lower part of the invention showing the discharge conduits for the filtrate and the turbid liquid.

FIG. 2 shows as a modification the cylinder 26 perforated, and therefore comprising the filter cake 2 on its interior.

In this case the worm 9 reaches the beginning of the conical base 22 and operates over its entire length.

On the outside of said cylinder 26 there is a cylinder 37 which defines an annular chamber 38 separated from the chamber 32 and connected to a discharge duct 39 containing a gate valve.

This design allows all the liquid contained in the filter to be filtered during the initial stage of the operation by feeding compressed air through the conduit 7 to push the liquid remaining in the filter downwards, and opening the gate valve 40 which remains closed during the entire filtering operation.

In order to be able to change the outer diameter of the worm 10 and hence the thickness of the filter cake, this change being of the order of a few millimeters, the worm (helical spiral) is connected to the perforated tube 10 only at its two ends 41 and 42. The end 42 is fixed by a collar 43 (see FIG. 1) rigid with the tube 10.

The end 41 is fixed to a collar 44 fixed on the tube 10.

The collar 44 is made rigid with the tube 10 by a through pin 45.

The tube 10 comprises a series of coplanar holes through which the pin 45 can enter. If the tube 10 is kept at rest and the collar 44 rotated in one direction or another, the diameter of the worm (or helical spiral) 9 changes within certain limits.

More simple variations are possible by moving the collar 44 axially along the perforated tube 10.

When the required diameter has been obtained, the pin 45 is inserted into the hole corresponding to the required diameter.

Figure 5:
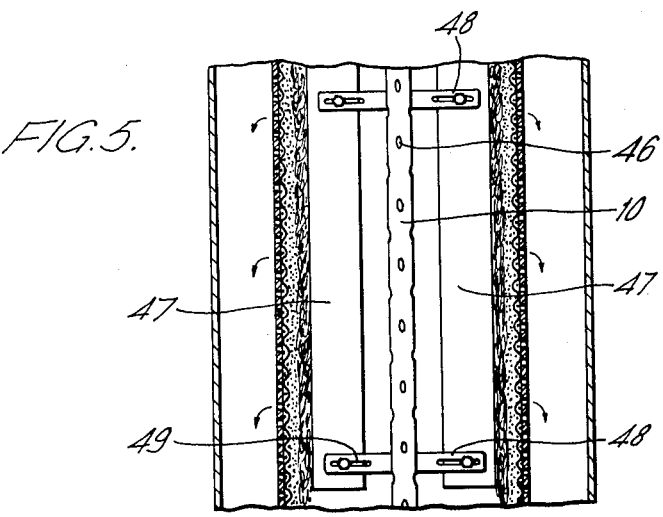
FIG. 5 shows an alternative design for the cake removal means.

An alternative design illustrated in FIG. 5 shows a tube 10 carrying blades 47 distributed symmetrically to safeguard the balance of the shaft while it rotates.

These blades 47 are supported by supports 48 rigid with the tube 10 and provided with a central slot 49. The slots 49 allow the radial position of the blades 47 to be varied, so changing the thickness of the filter cake.

Figure 3:
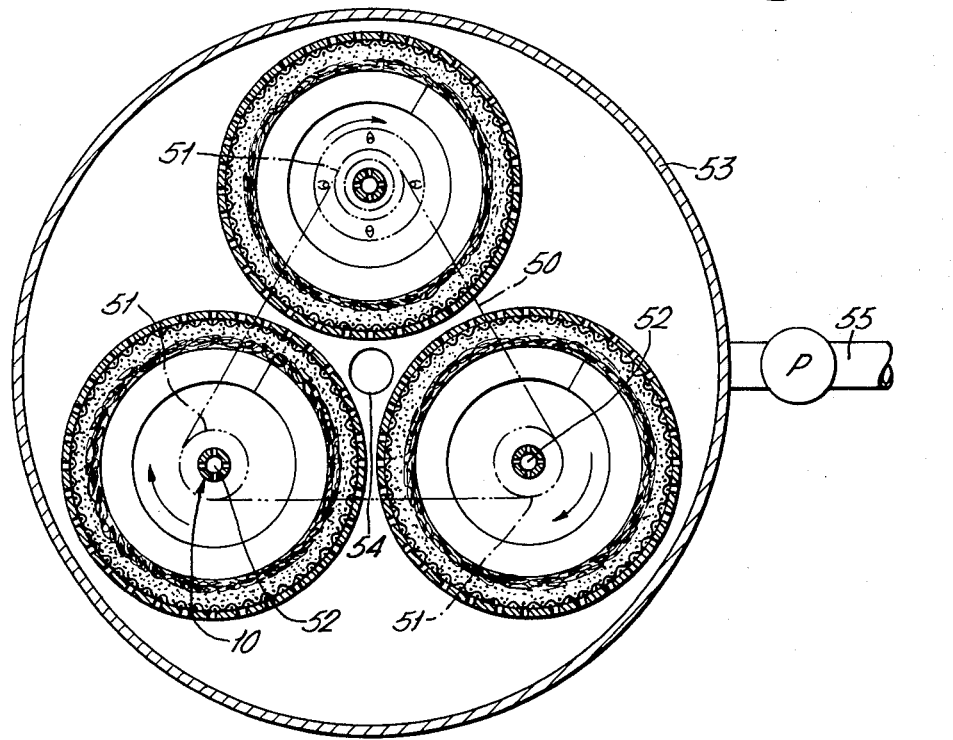
FIG. 3 is a horizontal section through a bank of three filters operating simultaneously and situated inside a single outer cylinder.

FIG. 3 shows a design comprising three of said filters driven simultaneously by a belt or chain 50 connected to a variable speed motor 51 and acting on three pulleys rigid with each shaft 52 on which the perforated tube 10 of the filters is keyed.

The three filters are placed in one cylinder 53 which replaces the outer cylinder 30 and comprises at its bottom a hole 54 connected to the discharge duct 55.

The invention is not limited to the embodiments heretofore described, and modifications and improvements may be made to them without leaving the scope of the inventive idea, the essential characteristics of which are summarized in the following claims.

What is claimed is:

1. Filter unit comprising in combination:
   an outer cylindrical casing,
   at least one perforate inner cylindrical casing encircled by and spaced inwardly from said outer casing,
   filter means carried on the inner surface of said inner casing,
   a shaft positioned axially of said inner casing and mounted to rotate therewithin,
   helical scraper means projecting radially from said shaft and attached thereto by means permitting adjustment of the distance between said scraper means and filter means, said scraper means terminating just short of said filter means,
   inlet means for introducing a fluid to be filtered between said shaft and inner casing,
   first outlet means for withdrawing filtered liquid from between said casings, and
   second outlet means for withdrawing from within said inner casing material which has been scraped from said filter by said scraper.

2. Filter unit as claimed in claim 1 in which said shaft is hollow and perforate, said unit comprising means for introducing liquid under pressure into said shaft for expulsion through the perforations therein.

3. Filter unit as claimed in claim 1 in which the axis of said inner casing is vertical, and said inner casing terminates at its lower end in an at least partially conical sump, said second outlet means being located at the bottom of said sump.

4. Filter unit as claimed in claim 1 comprising a plurality of inner casings within a single outer casing.

5. Filter unit as claimed in claim 1 in which said scraper means is fixed to said shaft at one end, and said means permitting adjustment of the distance between said scraper means and said filter means comprises, an annular member attached to the other end of said scraper means and mounted to be rotated about said shaft to thereby change the outer diameter of said scraper means.

6. Filter unit as claimed in claim 5 in which said shaft is coupled to a motor connected to rotate said scraper means continuously throughout a filtration cycle.

7. Filter unit as claimed in Claim 5 further comprising means for fixing said annular member to said shaft for rotation with the shaft.

* * * * *